April 9, 1929.  R. E. LYFORD  1,708,511
DRIVING MECHANISM
Filed Aug. 21, 1926   2 Sheets-Sheet 1
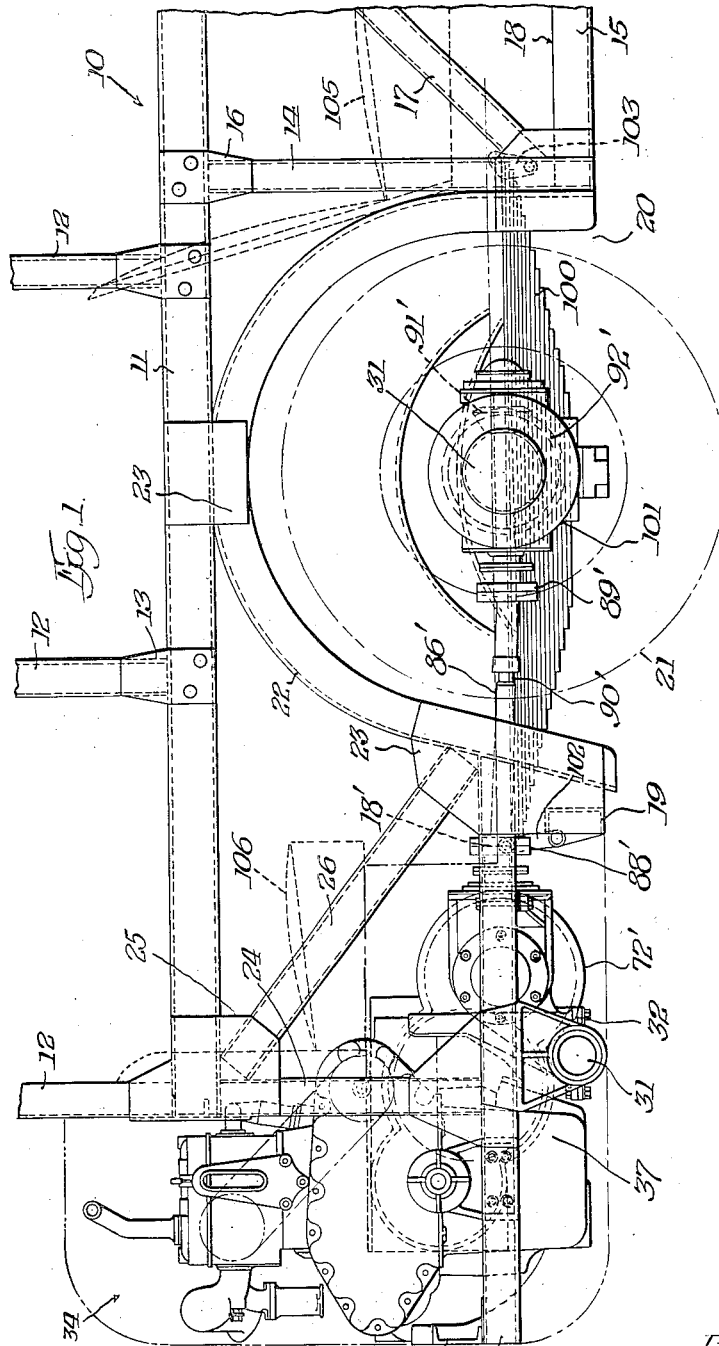
Witness:
Inventor.
Robert E. Lyford

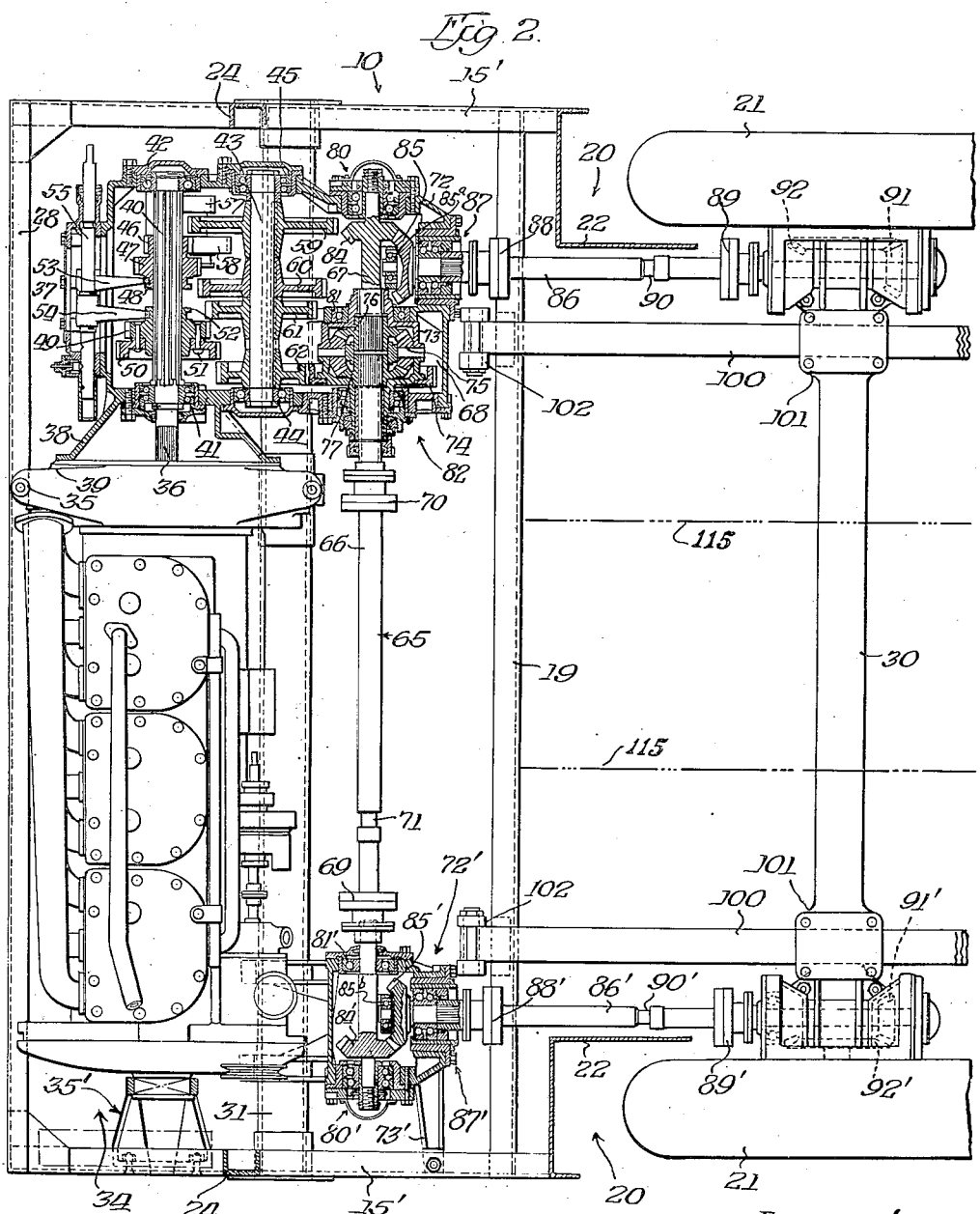

Patented Apr. 9, 1929.

1,708,511

UNITED STATES PATENT OFFICE.

ROBERT E. LYFORD, OF CHICAGO, ILLINOIS, ASSIGNOR TO INVENTION ENGINEERING CORPORATION, OF CHICAGO, ILLINOIS, A CORPORATION OF ILLINOIS.

DRIVING MECHANISM.

Application filed August 21, 1926. Serial No. 130,737.

My invention pertains in general to driving mechanism for motor vehicles and more specifically to novel mechanism for driving the rear wheels of a motor bus. I propose to provide a novel drive particularly adapted for use in conjunction with the motor bus disclosed in my co-pending patent application Serial No. 123,039, filed July 17, 1926.

In a vehicle of this type, it is not practical to drive the rear wheels from an engine positioned in the forepart of the chassis when a low floor level and a low center of gravity is desired.

It is evident that an ordinary propeller shaft drive is not satisfactory for the reason that it interferes with the low floor level. Obviously is would not be feasible to locate the shaft below a low floor level for the reason that it would be subject to injury and damage by coming into contact with bumps and projections on the road or ground. Also, altho it might be possible to devise some other type of a drive between the engine in the front of a vehicle and the rear axle other than a propeller shaft drive, such a drive would not be practical since it must, of necessity, extend thru the lower part of the vehicle. Thus it will be apparent that where a low floor level is desired in a motor vehicle it is practically impossible to drive the rear wheels from an engine positioned in the front of the vehicle. Moreover, a long propeller shaft has its drawbacks since it is subject to relatively great "whipping" and torsional vibration and hence in order for it to transmit power efficiently, it should be supported in bearings.

Now, a low floor level is not only advantageous as far as the balancing of the load is concerned but it facilitates loading since it is possible to align the floor with the curbing of a street during the loading or unloading thus eliminating the necessity of a step. Also such an arrangement lowers the weight, insures greater safety, reduces considerably the road stresses and minimizes the wear of the wheel bearings. Then, too, a low floor level economizes on space and enhances the appearance of the bus itself.

I propose to make a radical departure from the usual practice in the motor vehicle art by mounting the engine in the rear of the vehicle as close to the rear wheels as is feasible. Also I associate with the engine a conventional four speed accelerating and reverse transmission which is supported on one end of the engine; the engine being disposed with its crank shaft substantially parallel to the rear axle.

Furthermore, I propose to provide a novel drive for each of the rear wheels connected to the transmission thru a jack shaft located in the rear of the rear axle.

Now in order for the chassis frame to accommodate this driving mechanism, I construct the vehicle with its rear portion having a floor level slightly raised above the floor extending forwardly from the rear axle. This arrangement enables all but the last row of seats to be set low in the bus, thus giving the bus a low center of gravity and providing it with a low floor level.

Then too, I find that by mounting the engine in the rear of the motor bus, the door of the vehicle can be located in the extreme forward part of the vehicle directly opposite the driver where the driver has an unobstructed view and can readily see any one wishing to alight from the vehicle. This arrangement also gives the bus a more balanced condition than heretofore.

Other objects and advantages of my invention will more fully appear from the following detailed description taken in connection with the accompanying drawings which illustrate one embodiment thereof and in which, Figure 1 is a fragmentary side elevation of the rear end of a motor bus having driving means mounted thereon in accordance with the features of the present invention; and Fig. 2 is a plan view of the rear end of the vehicle partly in section clearly illustrating the drive between the transmission and the rear wheels.

Referring now to the drawings in detail in which like reference numerals designate similar parts throughout the several views, 10 denotes generally the body and chassis frame of a motor bus such as that disclosed in my co-pending patent application, Serial No. 123,039, filed July 17, 1926.

In Fig. 1, I have illustrated fragmentarily the rear end of the frame which is substantially the same as that shown in my co-pending application. The frame 10 includes longitudinal sills or frame members 11 connected by vertical channel bars to the top of the frame 10. The channel bars 12 are preferably connected to the longitudinal sill members 11 by means of gusset plates 13. The longitudinal sill members 11 are disposed substantially half way between the top and the bottom of the frame.

The longitudinal sills 11 are connected by vertical channel bars 14 to the bottom or floor channels 15. It should be noted that the vertical bars 14 are also connected to the sills 11 by means of gusset plates 16. The bottom channels 15 are adapted to support a floor 18 of the motor bus. This floor, as shown in Fig. 1 is relatively low and is adapted to be aligned with facility with the curbing. The vertical bars 14 are reinforced by diagonal frame members or struts 17 which are suitably fastened thereto.

The opposite sides of the frame 10 are connected by transverse channel beams 19 at the bottom of the frame. Each of the sides of the frame is provided with a recess designated generally by the reference character 20 for receiving a rear wheel 21 of the vehicle. In other words, the wheels 21 are positioned within the body lines of the chassis. The recesses 20 are formed by arcuate shaped sheet metal members 22 connected at 23 to the associated longitudinal sill members and at its bottom edges to the lower portions of the sides of the frame. One end of each frame member 22 is connected to the longitudinal bottom beams 15 and the other end is connected to the transverse channel beam 19. These arcuate shaped frame members form a part of the vehicle frame and also form a part of the body. These members also are utilized as mud guards or fenders.

It should be noted that at the rear end of the chassis frame, the floor 18' is slightly elevated above the floor 18 so as to accommodate the driving mechanism to be hereinafter described. This floor 18' is supported by longitudinal bottom beams 15' connected at one end to the gusset plates 23 fastened to the arcuate members 22. The plates 23 at the opposite sides of the frame are connected by channel beam 19. The beams 15' are connected to the longitudinal sills 11 by means of vertical channel bars 24 secured to the sills by means of gusset plates 25. Also each side of the frame is provided with a diagonal beam strut member 26 disposed between the plates 23 and 25 and suitably fastened thereto. The struts 26 serve as compression members, as will be more fully described hereinafter, and the vertical channel bars 24 serve as tension members.

The longitudinal channel beams 15' (Fig. 2) are connected at their rear ends by means of a transverse channel beam 28. This beam 28 is disposed substantially parallel to the rear axle 30 which connects the rear wheels 21. Positioned between the axle 30 and the transverse channel beam 28 is a circular tube 31 secured at its ends to the parallel longitudinal beams 15'. This tube 31 is fastened by means of brackets 32 to the beams 15'. The function of this tube is to serve as a torsional member adapted to resist any rocking movement between the sides of the frame 10. This tube also serves as the principal supporting member for the motor 34 positioned in the rear of the chassis frame 10.

The motor 34, as best shown in Fig. 2 is positioned with its crank shaft parallel to the tube 31. The beam 28 and the tube 31 are adapted to co-operate with each other in properly supporting the motor or engine 34. The motor 34 may be of any conventional construction and does not per se constitute a feature of my invention. I preferably support engine 34 by means of member 35 which extends over the upper portions of the beam 28 and the tube 31 and the member 35'. In other words, the engine has a three-point support. The engine is fastened to these two parallel members in such a manner that the greater part of the weight of the engine is carried by the relatively large tubular member 31.

The beams 15' cooperate with the tube or member 31 in supporting the engine 34. Also I preferably connect the beam 28 to the beams 15' in such a manner that it can be readily removed from the frame 10 for the purpose of facilitating the dismantling of the engine. Furthermore, is will be more obvious from the following detailed description, I arrange and interconnect the driving mechanism located between the engine and the rear axle in such a manner that the adjustment and replacement of the individual parts is possible without dismantling the whole rear system.

One end of the crank shaft 36 of the engine 34 is connected to an accelerating and reverse transmission 37. This transmission in general is of a conventional four speed type such as that which is commonly used on busses and other heavy motor vehicles. The transmission housing 38 is fastened to the fly-wheel housing 39. The crank shaft 36 connects through a conventional clutch (not shown) with a splined extension shaft 40 which projects into the transmission casing 38. This extension shaft is suitably journaled in ball bearing units 41 and 42 located at the ends of the transmission housing. Also positioned in the housing 38 is a countershaft 43 disposed parallelly to the shaft 40. This shaft 43 is journaled at its ends in ball bearing units 45 and 44. Mounted on the shaft 42 are a pair of low speed gears 46 and 47 which are preferably formed integral. The gear 47 is provided with a collar 48 by means of which the two gears 46 and 47 may be shifted axially along the splined shaft 40. Also mounted on the shaft 40 are a pair of connected high speed gears 49 and 50 which are preferably fastened together by means of rivets 51. The gear 49 is provided with a collar 52 by means of which the gears 49 and 50 may be shifted axially along the shaft 40. The gears 46 and 47 constitute first and second speed gears respectively. The gears 49 and 50 constitute third and fourth speed gears respectively. The collars 48 and 42 are connected to shifting forks 53 and 54 respectively which are connected to a conventional gear shift mechanism designated generally by the reference character 55. This gear shift mechanism 55 does not per se constitute a part of the present invention and it is therefore believed that no detail description of the same is necessary. The gear shift mechanism 55 is adapted to be operated through the means of suitable leverage not shown connected to the driver's station at the forward part of the vehicle. Associated with the shiftable gears 46 and 47 are a pair of reverse idlers 57 and 58 which are preferably integral and are rotatably carried by the transmission housing 38. The arrangement of the reverse idlers 57 and 58 is well known in the transmission art and it is therefore believed that no further description of the same need be made.

Fastened to and mounted on the rotatable countershaft 43 are four spaced gears 59, 60, 61 and 62 adapted to co-operate with gears 46, 47, 49 and 50 respectively. The gear 59 is also adapted to co-operate with the reverse idler 57 in a manner well known to those familiar with the present art.

Referring to Fig. 2, it will be noted that I have positioned between the engine and the rear axle a jack shaft designated generally by the reference character 65. This jack shaft includes a pair of spindles 66 and 67 connected by a differential indicated generally by the reference character 68. The section or spindle 66 of the shaft 65 includes a pair of flexible couplings 69 and 70 also the spindle section 66 is divided into two parts which telescope each other through splines at 71. This telescoping connection adds to the flexibility of the jack shaft 65.

The transmission housing 38 has formed integral therewith an extension 72 for housing the differential 68 and providing journals for the ends of the spindles 67 and 66. The differential 68 includes a cage 73 having connected thereto a spur gear 74 at all times in mesh with the teeth of gear 62 connected to the countershaft 43. The cage 73 carries a plurality of dog pinions 75 which are adapted to rotate with the gear cage 73. These pinions are of the bevel type and mesh with a pair of gears 76 and 77 also of the bevel type. The gear 76 is secured to the splined end of shaft or spindle 67 and the bevel gear 77 is secured to the splined end of the spindle 66. It should be noted that the differential gear cage 73 is rotatably mounted upon the ends of the spindles 66 and 67. One end of the spindle 67 is journaled in a ball bearing 80 carried by the extension 72. Also the spindle 67 is journaled at its other end in an intermediate ball bearing unit 81 through the bearing end of cage 73. The spindle 66 is journaled at one end in a ball bearing unit 82, carried by a removable portion of the extension 72 of the housing.

It should be noted (Fig. 2) that the ends of the three shafts 65, 86 and 86' are removable axially from the associated gear housing. That is to say, it is possible to remove each of the aforesaid shafts and its associated pinion from the gear housing by first removing the bearings and then moving the shaft axially. Also all bearings carrying bevel gears are adjustable to assume proper pitch line contact.

The spindle 67 has formed integral therewith a bevel gear 84 located within the extension 72. This bevel gear 84 meshes with a bevel gear 85 connected to a drive shaft 86 extending at right angles to the jack shaft 67. The rear end of the drive shaft 86 is journaled in a ball bearing unit 87 carried by the extension 72 of the transmission housing. Also the drive shaft 86 includes flexible joints 88 and 89. The drive shaft 86 comprises two parts which telescope each other at 90. This telescoping connection adds to the flexibility of the shaft. The forward end of the drive shaft 86 carries a bevel pinion 91 which meshes with a bevel pinion 92 connected to the rear wheel 21 associated therewith. This driving mechanism between the forward end of the drive shaft 86 and the rear wheels is clearly illustrated and described in detail in my co-pending patent application Serial No. 128,121, filed Aug. 9, 1926.

The other end of the jack shaft 65 extends into a gear casing 72' fastened to the frame member 15' by means of a bracket 73'. This casing 72' is also suitably connected to the transverse tubular torsion member 31. The end of the shaft 65 adjacent the coupling 69 is journaled in a bearing 81'. The extreme end of this shaft 65 has fastened thereto a bevel gear 84' which at all times meshes with a bevel gear 85' fastened to a drive shaft 86' disposed at right angles to the jack shaft 65 and parallelly with the drive shaft 86. This extreme end of the spindle 66 is journaled in a bearing 80' carried by the casting 72'. Also the rear end of the drive shaft 86' is journaled in a ball bearing unit 87' disposed in the casing 72'. The drive shaft 86' is provided with a pair of flexible couplings 88' and 89'. Also the shaft 86' preferably comprises two telescoping parts which telescope each other at 90'. The forward end of this drive shaft 86' carries a bevel pinion 91' which meshes with a bevel pinion 92' connected to the corresponding rear wheel 21.

The driving mechanism associated with the forward end of the drive shaft 86' for connecting it to the associated rear wheel is described in detail in my co-pending patent application Serial No. 128,121, filed Aug. 9, 1926. It should be noted that the extreme rear end of each of the shafts 86 and 86' is journaled in a pilot bearing 85ª—85ᵇ. This bearing is preferably of the ball bearing type and is suitably connected to the casing adjacent the associated pinion 85—85'.

Referring again to Fig. 2, I shall now proceed to describe the leaf springs associated with the axle 30. These springs are identical in construction and it is believed a description of one will suffice for the both. The pair of springs are positioned parallel to each other and at right angles to the axle. Each of these springs 100 is fastened in the conventional way to the axle 30 at 101. The rear end of each spring 100 is shackled at 102 to the transverse channel beam 19. The forward end of each of the springs 100 (Fig. 1) is shackled at 103 to a transverse frame member and to an extension of the arcuate member 22 (not shown).

In Fig. 1, I have illustrated the floor portion 18' as being slightly elevated with respect to the main floor 18 of the vehicle in order to accommodate the driving mechanism associated with the drive shafts 86 and 86' although the main aisle space can be extended through to the rear seat on the same level as the front. That is to say the space between the springs 100 can be utilized as an aisle which will extend below the floor 18' thus providing standing space in the rear of the vehicle as well as in the forepart. In Fig. 2, I have indicated by dotted lines 115 the location of this aisle which permits passengers to stand in the rear of the vehicle without increasing the height of the vehicle. Furthermore if desired, individual seats may be disposed along the sides of this aisle immediately over the junction of each spring and the axle.

It will be noted that the seats 105 on the main floor 18 of the vehicle are disposed somewhat lower than the row of seats 106 carried by the floor portion 18'. All of the seats forward of the rear wheels are disposed like the seats shown in dotted lines, Fig. 1, and designated by the reference character 105. This arrangement results in only one row of seats 106 (shown in dotted line in Fig. 1) being slightly elevated. This construction does not affect the low center of gravity of the vehicle and permits of a relatively low floor level especially in the loading zone of the vehicle. I preferably provide the forward part of the vehicle as best shown in my co-pending application, Serial #123,039, with a door positioned opposite the driver of the vehicle so that the driver may have an unobstructed view of all persons entering or leaving the vehicle. Moreover, the low floor level permits the driver to align the floor 18 with a curbing with facility. This arrangement eliminates the necessity for a step in the region of the door.

The operation of my novel driving mechanism is briefly as follows;

The engine 34 positioned in the rear of the motor vehicle is controlled from the driver's station located at the forward part of the vehicle by conventional mechanism. The transmission 37 is in general a conventional four speed transmission and is operated by means of suitable leverage running from the rear of the vehicle to the driver's station. The operation of this transmission is believed to be obvious to those familiar with such mechanisms. The gear 62 of the transmission is at all times in mesh with the gear 74 fastened to the differential cage 73 which is driven by the transmission. This differential serves to couple together the two spindles 66 and 67 of the jack shaft 65. The differential functions in the well known manner to take care of variations in the speed of the two rear wheels 21. The spindle 67 through the bevels 84 and 85 drives the shaft 86 connected to the rear wheels 21 to suitable gearing. Similarly the spindle 66 drives the shaft 86' through the bevels 84' and 85'. It should be noted that in order to insure maximum efficiency, as far as the operation of the driving mechanism is concerned, I preferably make the jack shaft 65 and both of the drive shafts 86 and 86' highly flexible in character. The telescoping joints 71, 90 and 90' provide each of these shafts with great flexibility. The drive shafts 86 and 86' are relatively short when compared with the usual propeller shaft. Thus it will be seen that a much better drive will take place between the engine and the rear wheel.

As previously described, the torsion member 31 is adapted to carry the major part of the weight of the engine 34. The bending of the sills or channel members 15' with the weight of the engine thereon is resisted by the tension frame members 24 and the compression frame members 26. This arrangement provides an ideal support for the engine construction 34. Also the weight disposed on the floor 18 and 18' is transmitted through the vertical frame members to the longitudinal sill members 11 which impose the weight on the springs 100 through the arcuate frame members 22. The arcuate frame members as pointed out above define recesses 20 in the chassis of the vehicle and also serve as mud guards or fenders for the rear wheels 21. This feature is more fully disclosed and covered in my co-pending patent application Serial #123,039.

Now, I desire it understood that although I have described in detail the preferred embodiment of my invention, the invention is not to be limited thereby but only in so far as defined by the scope and spirit of the appended claims.

I claim:—

1. In combination in a motor vehicle, a frame having a low center of gravity and including as low a floor as practical, the rear of said frame comprising a transverse tubular torsion rod, a rear axle connected to said frame, wheels connected to the axle, an engine mounted on the rod at the rear of the frame in the rear of said axle, a jack shaft positioned adjacent the rear axle and driven by the engine, and driving means between the wheels and said jack shaft, said floor having a raised portion at the rear of frame for accommodating the said driving means.

2. In combination in a motor bus, a frame including a loading station at the forward end of the vehicle, a rear axle carried by the frame, wheels on the said axle, a relatively low floor secured to the frame and lying in a plane substantially below the wheel centers of the vehicle so as to facilitate loading, an engine mounted on the rear end of the frame, an accelerating reverse transmission mounted adjacent the engine and driving means for connecting the transmission to the rear wheels, the floor level of the said vehicle being raised at the rear end in order to accommodate said driving means, said rear end of the frame being reinforced by a transverse tubular torsion member adapted to carry the major weight of the engine.

3. In combination, a body and frame including main longitudinal sills disposed substantially half way between the top and bottom of the sides of the frame, longitudinal sub-sills connected to the bottom of the sides of the frame, a floor supported by and between said sub-sills, a rear axle disposed at the rear end of said sub-sills, a torsional rod connecting the rear ends of the sub-sills for preventing rocking of the sides of the frame, a jack shaft located adjacent the rod in the rear of the axle and driving means connecting the shaft to the axle.

4. In combination, in a motor vehicle, a frame, a rear axle connected to the frame, wheels on the said axle, said frame including a transverse tubular member positioned at the rear end thereof, an engine mounted on the rear end of the frame relatively close to said rear axle partly supported by the said tubular member, the said tubular member being adapted to support the major part of the weight of the engine, the crank shaft of the said engine being disposed parallel to the said transverse tubular member, a transmission of the accelerating and reverse type positioned at one extremity of the engine and operatively connected thereto, and a pair of drives one for each of the said rear wheels connected to the said transmission.

5. In combination, in a motor vehicle, a frame, a rear axle connected to the frame, wheels on the said axle, said frame including a beam positioned at its rearmost extremity, a tubular torsion rod spaced from the beam and connected to the frame between the beam and the rear axle, an engine mounted on the said beam and rod with its crank shaft substantially parallel to the rear axle, a transmission associated with one end of the said engine and operatively connected thereto, and driving means between the said transmission and the rear wheels of the vehicle.

6. In combination, in a motor vehicle, a frame, a rear axle connected to the frame, wheels on the said axle, an engine mounted on the said frame in the rear of the said axle, a jack shaft positioned between the engine and the rear axle, driving means for connecting the engine to the said jack shaft and a pair of drives for connecting the said jack shaft to the rear wheels, each of the said drives comprising a flexible shaft operatively connected to one end of the said jack shaft.

7. In combination, in a motor vehicle, a frame, a rear axle connected to the frame, wheels on the said axle, an engine mounted on the frame in the rear of the said axle, a transmission operatively connected to the said engine, a jack shaft positioned between the engine and the rear axle, said jack shaft being flexible and comprising a plurality of aligned parts and driving means between the ends of the said jack shaft and the said rear wheels.

8. In combination, in a motor vehicle, a frame, a rear axle connected to the frame, wheels on the said axle, an engine mounted on the frame in the rear of the said axle, a transmission operatively connected to the engine comprising a pair of parallel shafts, shiftable gearing on one of the shafts and fixed gearing on the other shaft, a differential having a gear in mesh with one of the said fixed gears of the transmission, said shiftable gear shaft of the transmission being connected to and driven by the said engine, spindles driven by the said differential comprising a jack shaft, and driving means between the said spindles and the said rear wheels.

9. In combination, in a motor vehicle, a frame, a rear axle mounted on the frame, wheels on the said axle, an engine mounted on the frame in the rear of the said axle, a transmission associated with one end of the engine and operatively connected thereto, a jack shaft positioned between the engine and the rear axle, said jack shaft being operatively connected to the said transmission, a pair of flexible drive shafts operatively connected to the rear wheels, and bevel gearing between an end of each of the said shafts and an end of the jack shaft.

10. In combination, in a motor vehicle, a frame, a rear axle connected to the frame, wheels on the said axle, an engine mounted on the frame in the rear of the axle, a flexible jack shaft positioned between the engine and the said rear axle, driving means between the engine and the said flexible jack shaft, a pair of flexible shafts between the ends of the said jack shaft and the said rear wheels, gearing for connecting an end of each of the said shafts to an end of the jack shaft and gearing for connecting the said flexible shafts to the wheels.

11. In combination, in a motor vehicle, a frame, a rear axle, a pair of springs connecting said axle to the frame, a pair of wheels connected to said axle, an engine carried by the frame, a transmission operatively connected to said engine, said engine and transmission being disposed above the plane of the springs, a jack shaft positioned parallel to said rear axle and driven by said engine through said transmission, and a pair of flexible drive shafts, for connecting said jack shaft to said wheels, said shafts being substantially parallel with said springs and being movable upward and downward with said springs, the arc of movement of each of said shafts being substantially the same as that of the associated spring.

12. In a motor vehicle, springs secured to the rear axle of the vehicle, connections between the ends of the springs and the vehicle frame, a motor, and driving connections between the motor and the rear wheels, said connections including drive shafts disposed substantially parallel with the springs and provided with flexible joints disposed and adapted to permit movement of the shafts with the springs and through arcs of a radius substantially equal to the radius of the arcs of movement of said springs.

13. In a motor vehicle, springs secured to the rear axle of the vehicle and having their ends connected to the vehicle frame, a motor, and driving connections between the motor and the rear wheels including drive shafts disposed substantially parallel with the springs and provided with flexible joints disposed closely adjacent the axle and the connections between the ends of the springs and the frame, said joints permitting movement of the shafts through arcs substantially coincident with the arcs of movement of the springs.

14. In a motor vehicle, springs secured to the rear axle of the vehicle and having their ends secured to the vehicle frame, and drive shafts having driving connection with the rear wheels, said shafts being adapted and disposed for movement through arcs substantially coincident with the arcs of movement of the springs.

15. In combination in a motor vehicle, a frame, a rear axle connected to the frame, wheels on said axle, an engine mounted on the frame in rear of the axle and disposed with its drive shaft in substantial parallelism with the axle, a two part jack shaft between the engine and the axle and in substantial parallelism with the latter, a differential drive between the parts of said shaft, a pair of flexible drive shafts driven from the respective parts of the jack shaft, driving connections between the drive shafts and said wheels, and driving connections between the engine drive shaft and said jack shaft.

In witness whereof, I hereunto subscribe my name this 17th day of August, 1926.

ROBERT E. LYFORD.